United States Patent
Yoo

(10) Patent No.: US 10,663,967 B2
(45) Date of Patent: May 26, 2020

(54) AUTOMATED DRIVING CONTROL DEVICE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Kyung Ho Yoo, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 43 days.

(21) Appl. No.: 15/608,249

(22) Filed: May 30, 2017

(65) Prior Publication Data

US 2018/0164811 A1    Jun. 14, 2018

(30) Foreign Application Priority Data

Dec. 14, 2016  (KR) .................. 10-2016-0170219

(51) Int. Cl.
*G05D 1/00* (2006.01)
*B60W 30/18* (2012.01)
*G05D 1/02* (2020.01)
*B60W 30/12* (2020.01)
(Continued)

(52) U.S. Cl.
CPC .......... *G05D 1/0088* (2013.01); *B60W 30/12* (2013.01); *B60W 30/16* (2013.01); *B60W 30/18154* (2013.01); *G05D 1/024* (2013.01); *G05D 1/0274* (2013.01); *G05D 1/0278* (2013.01); *B60W 2556/50* (2020.02); *G01C 21/3658* (2013.01); *G05D 2201/0213* (2013.01)

(58) Field of Classification Search
None
See application file for complete search history.

(56) References Cited

U.S. PATENT DOCUMENTS

| 5,684,696 A * | 11/1997 | Rao | B60K 31/0008 318/587 |
| 8,494,716 B1 * | 7/2013 | Lee | G05D 1/0246 382/103 |
| 9,170,116 B1 * | 10/2015 | Joshi | G01C 21/32 |

(Continued)

OTHER PUBLICATIONS

Blanco, M., Atwood, J., Vasquez, H.M., Trimble, T.E., Fitchett, . . . & Morgan, J.F. Human Factors Evaluation of Level 2 and Level 3 Automated Driving Concepts https://www.nhtsa.gov/sites/nhtsa.dot.gov/files/812182_humanfactorseval-I2I3-automdrivingconcepts.pdf (Year: 2015).*

*Primary Examiner* — Rami Khatib
(74) *Attorney, Agent, or Firm* — Brinks Gilson & Lione

(57) ABSTRACT

The present disclosure relates to an automated driving control device, a system including the automated driving control device, and a method of automated driving control. The automated driving control device may include: a high-precision lane-level road map storage storing a high-precision lane-level road map; a position recognition controller recognizing a current position of a vehicle based on the high-precision lane-level road map, position recognition information, and vehicle control information; and a vehicle controller generating a path for driving to a destination based on the position of the vehicle recognized by the position recognition controller and obstacle recognition information, and controlling driving of the vehicle.

17 Claims, 16 Drawing Sheets

(51) Int. Cl.
*B60W 30/16* (2020.01)
*G01C 21/36* (2006.01)

(56) References Cited

U.S. PATENT DOCUMENTS

| | | | | |
|---|---|---|---|---|
| 9,483,700 | B1* | 11/2016 | Chen | G06K 9/00798 |
| 9,494,438 | B1* | 11/2016 | Ichinokawa | G01C 21/30 |
| 9,731,724 | B2* | 8/2017 | Yoon | B60W 30/18163 |
| 9,783,194 | B2* | 10/2017 | Seo | B60W 30/06 |
| 2007/0055443 | A1* | 3/2007 | Sumizawa | G01C 21/3461 |
| | | | | 701/423 |
| 2007/0106470 | A1* | 5/2007 | Nakayama | G01C 21/3629 |
| | | | | 701/437 |
| 2008/0262721 | A1* | 10/2008 | Guo | G01C 21/32 |
| | | | | 701/532 |
| 2011/0276257 | A1* | 11/2011 | Zaitsu | G01C 21/26 |
| | | | | 701/117 |
| 2012/0123672 | A1* | 5/2012 | Kojima | G01C 21/3658 |
| | | | | 701/410 |
| 2017/0039436 | A1* | 2/2017 | Chen | G06K 9/00798 |
| 2017/0074663 | A1* | 3/2017 | Giurgiu | G01C 21/20 |
| 2018/0113474 | A1* | 4/2018 | Koda | G08G 1/09 |

* cited by examiner

<NAVIGATION MAP DB SCHEMA>

| No | Column | Remark |
|----|--------|--------|
| 1 | LINKID | LINK ID |
| 2 | MAPID | MAP ID |
| 3 | LANENUM | TOTAL NUMBER OF LANES |
| ⋮ | ⋮ | ⋮ |

<LANE-LEVEL ROAD MAP DB SCHEMA>

| No | Column | Remark |
|----|--------|--------|
| 1 | LANEID | LANE ID |
| 2 | MAPID | MAP ID |
| 3 | LINKID | LINK ID |
| ⋮ | ⋮ | ⋮ |

FIG.2

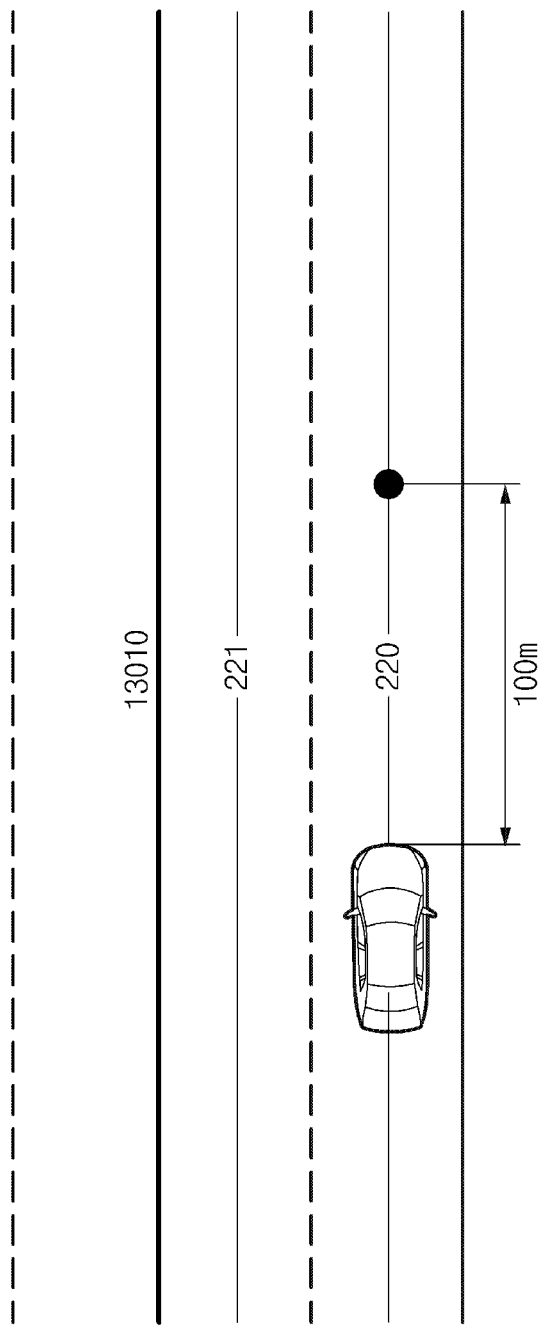

AUTOMATED DRIVING CONTROL DEVICE, SYSTEM INCLUDING THE SAME, AND METHOD THEREOF

CROSS-REFERENCE TO RELATED APPLICATION

The present application claims priority to and the benefit of Korean Patent Application No. 10-2016-0170219, filed on Dec. 14, 2016, which is incorporated herein by reference in its entirety.

FIELD

The present disclosure relates to an automated driving control device, a system including the same, and a method thereof.

BACKGROUND

The statements in this section merely provide background information related to the present disclosure and may not constitute prior art.

An autonomous vehicle is a system that is capable of driving safely to a designated destination by recognizing obstacles around the vehicle and accurately identifying the position of the vehicle in real time. There are a variety of methods for indicating a location of a vehicle, such as an earth-centered earth fixed (ECEF) coordinate system and a plane coordinate system (for example, a TM coordinate system). However, in order to accurately locate the vehicle while considering the characteristics of the vehicle driving on the road under special conditions, it is desired to identify the number of lanes on the road, i.e., which lane the vehicle is currently driving, and a relative position of the vehicle to lines within the lane.

We have discovered that such lane information may not be accurately identified by conventional coordinate systems including the ECEF coordinate system and the plane coordinate system (for example, TM coordinate system), and thus an automated driving control system may fail to accurately identify the position of the vehicle in real time.

The failure to accurately identify the position of the vehicle in real time may lead to a big accident. Therefore, it is desired to accurately identify the position of the vehicle on the road on which the vehicle is currently driving.

SUMMARY

The present disclosure addresses the above-mentioned problems occurring in the prior art while advantages achieved by the prior art are maintained intact.

The present disclosure provides an automated driving control device, a system including the same, and a method thereof, which are designed to generate a path in light of information fusion of position recognition information and vehicle control information based on a high-precision lane-level road map, and obstacle detection information, and control automated driving, thereby improving the reliability of automated driving.

An aspect of the present disclosure also provides an automated driving control device, a system including the same, and a method thereof, which are designed to generate, by a position recognition controller, a simple message containing position recognition information and vehicle control information and transmit the message to a vehicle controller through controller area network (CAN) communications to reduce communication load and enable real-time information recognition and processing for automated driving, thereby improving the reliability of automated driving.

In one aspect of the present disclosure, an automated driving control device includes: a high-precision lane-level road map storage configured to store a high-precision lane-level road map; a position recognition controller configured to recognize a current position of a vehicle based on the high-precision lane-level road map, position recognition information, and vehicle control information; and a vehicle controller configured to generate a path for driving to a destination based on the position of the vehicle recognized by the position recognition controller and obstacle recognition information, and to control driving of the vehicle.

The high-precision lane-level road map may be associated with a navigation map through LINK ID, and may include lane information.

The lane information may include information about a connection of a lane section on which the vehicle is currently driving to another lane section ahead of or behind the vehicle.

The position recognition controller may include: an information fusion unit configured to fuse the position recognition information and the vehicle control information based on the high-precision lane-level road map; and a position recognition message generation unit configured to generate a position recognition message containing the fused position recognition information and vehicle control information.

The vehicle controller may include: a path generation unit configured to generate a global path when the destination is input, and to generate a local path based on the position recognition information, the vehicle control information, the high-precision lane-level road map, and the obstacle detection information while the vehicle is driving; and a controlled variable calculation unit configured to calculate a controlled variable for vehicle control according to the local path.

The automated driving control device may further include a current position calculation unit calculating the current position of the vehicle to determine whether or not the vehicle has arrived at the destination.

The position recognition information may include at least one of MAP ID, LINK ID, and LANE ID with respect to the current position of the vehicle.

The vehicle control information may include at least one of a width of a currently driving lane, a lateral offset of the vehicle with respect to a centerline of the currently driving lane, a heading angle of the vehicle with respect to the centerline of the currently driving lane, a distance left to a next node with respect to the current position of the vehicle, or a curvature of a road with respect to the current position of the vehicle.

In another aspect of the present disclosure, an automated driving control system includes: a position recognition system configured to recognize a current position of a vehicle from global navigation satellite system (GNSS) information; a context-aware sensor system configured to detect an obstacle around the vehicle; and an automated driving control device configured to generate a path of the vehicle in light of position recognition information and vehicle control information based on a high-precision lane-level road map from the position recognition system and obstacle detection information from the context-aware sensor system and to control automated driving of the vehicle.

The automated driving control device may include: a position recognition controller configured to recognize the current position of the vehicle based on the high-precision lane-level road map, the position recognition information, and the vehicle control information; and a vehicle controller configured to generate a path for driving to a destination based on the position of the vehicle recognized by the position recognition controller, and to control the driving of the vehicle.

The automated driving control device may further include a high-precision lane-level road map storage configured to store the high-precision lane-level road map that is associated with a navigation map through LINK ID and includes lane information.

The context-aware sensor system may include at least one of a camera, a radio detection and ranging (RADAR) sensor, a light detection and ranging (LiDAR) sensor, or an ultrasonic sensor.

In another form of the present disclosure, an automated driving control method includes: generating, by a path generation unit, a global path when a destination is input; starting, by an automated driving control device, a vehicle to drive according to the global path; generating, by the path generation unit, a local path based on at least one of position recognition information, vehicle control information, a high-precision lane-level road map, or obstacle detection information while the vehicle is driving; and controlling, by the automated driving control device, the vehicle to drive according to the local path.

The automated driving control method may further include calculating, by the automated driving control device, a current position of the vehicle to determine whether or not the vehicle has arrived at the destination, and ceasing to control the vehicle when the vehicle has arrived at the destination.

The high-precision lane-level road map may be associated with a navigation map through LINK ID, and may include lane information.

The lane information may include information about a connection of a lane section on which the vehicle is currently driving to another lane section ahead of or behind the vehicle.

The position recognition information may include at least one of MAP ID, LINK ID, or LANE ID with respect to a current position of the vehicle.

The vehicle control information may include at least one of a width of a currently driving lane, a lateral offset of the vehicle with respect to a centerline of the currently driving lane, a heading angle of the vehicle with respect to the centerline of the currently driving lane, a distance left to a next node with respect to a current position of the vehicle, or a curvature of a road with respect to the current position of the vehicle.

The generating of the local path may include determining a lane change timing when there is an obstacle around the vehicle from the obstacle detection information, generating a lane change curve, and calculating a controlled variable of the vehicle.

The controlled variable of the vehicle may include variables in steering and speed of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 illustrates an example of a database schema of a high-precision lane-level road map;

FIG. 6A illustrates vehicle control when the vehicle arrives at a destination;

Figure 1:
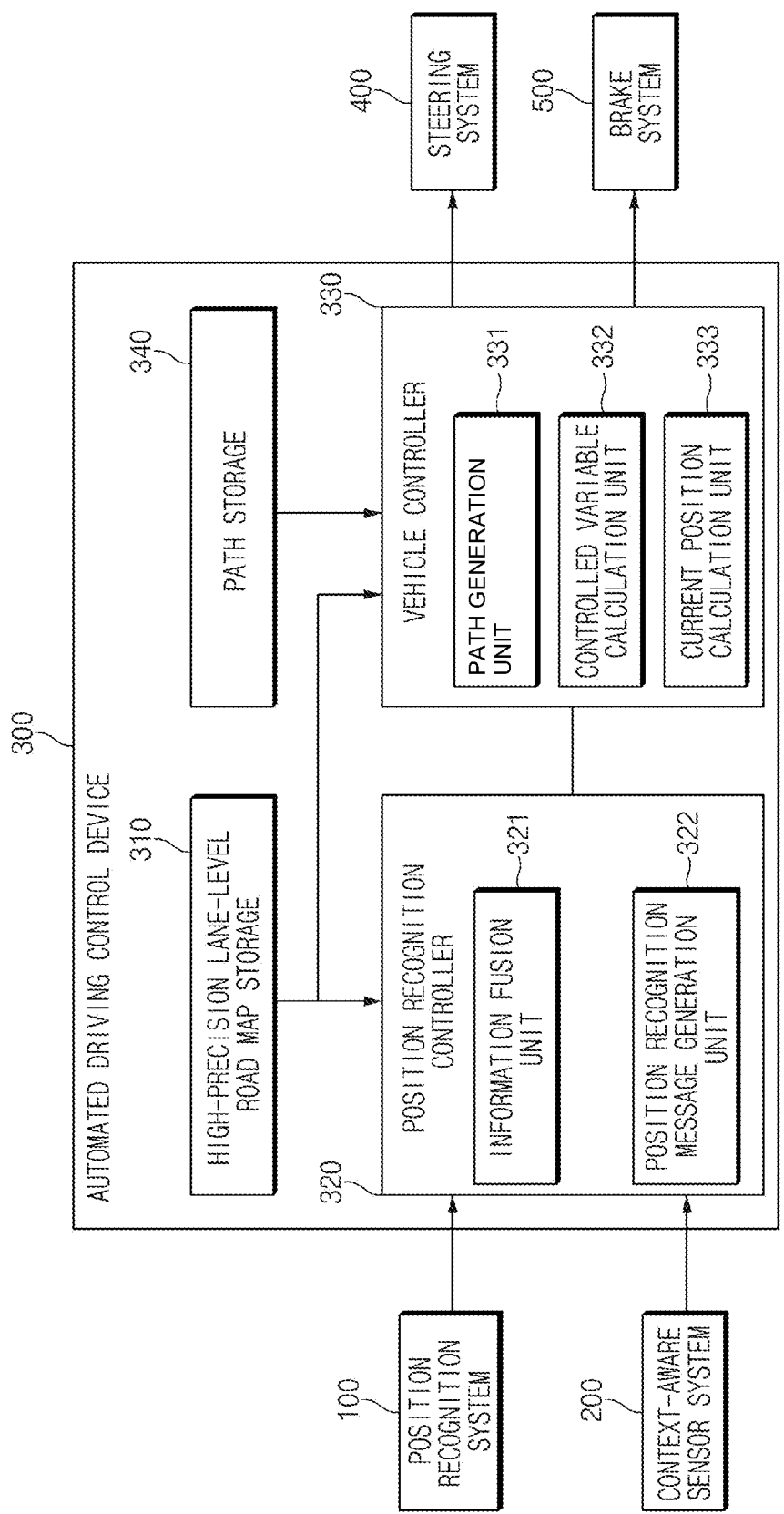
FIG. 1 illustrates the configuration of an automated driving control system.

The drawings described herein are for illustration purposes only and are not intended to limit the scope of the present disclosure in any way.

DETAILED DESCRIPTION

Hereinafter, exemplary forms of the present disclosure will be described in detail with reference to the accompanying drawings. In the drawings, the same reference numerals will be used throughout to designate the same or equivalent elements. In addition, a detailed description of a related known function or configuration will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present disclosure.

Hereinafter, exemplary forms of the present disclosure will be described in detail with reference to FIGS. 1 to 12.

FIG. 1 illustrates the configuration of an automated driving control system, in exemplary forms of the present disclosure.

An automated driving control system refers to a system that is capable of controlling the vehicle to move safely from a current location to a destination without a driver's intervention. The automated driving control system may fuse a high-precision lane-level road map, position recognition information, and context-aware information to identify a current position of the vehicle in real time and control automated driving, thereby improving the reliability of automated driving control. In particular, the system uses a high-precision lane-level road map including a relative positional relationship of the vehicle within a lane (such as distances of the vehicle from left and right lines, direction angle, and distance left to a forward node), along with map ID, navigation ID, and link ID of the vehicle located on the map, instead of conventional local or global coordinate systems, and thus the current position of the vehicle may be identified more accurately.

To this end, the automated driving control system, in exemplary forms of the present disclosure, includes a position recognition system 100, a context-aware sensor system 200, an automated driving control device 300, a steering system 400, and a brake system 500.

The position recognition system 100 may receive global navigation satellite system (GNSS) information or use ultrasonic beacons (not shown) or the like to recognize a current position of the vehicle.

The context-aware sensor system 200 may detect obstacles around the vehicle. To this end, the context-aware sensor system 200 includes a camera, a radio detection and ranging (RADAR) sensor, a light detection and ranging (LiDAR) sensor, and an ultrasonic sensor.

The automated driving control device 300 may generate a path of the vehicle, in light of position recognition information and vehicle control information based on a high-precision lane-level road map from the position recognition system 100, and obstacle detection information from the context-aware sensor system 200, to control automated driving. To this end, the automated driving control device 300 includes a high-precision lane-level road map storage 310, a position recognition controller 320, a vehicle controller 330, and a path storage 340.

The high-precision lane-level road map storage 310 may store a high-precision lane-level road map. In general, a navigation map is used to guide a vehicle to a path for driving to a destination. The navigation map is kind of a topological map, includes links and nodes, and is an architecture for use in an automotive navigation map, a shortest path algorithm for indoor robots, a network communication model design, and the like. Such a topological map is easy to simplify and represents a system model and reduces data volumes, but represents data in a concise form such that it has limited applications in fields desiring more precise and detailed representations (for example, highly automated driving map). For this reason, the high-precision lane-level road map providing more precise representations may be used in the present disclosure.

Figure 3:
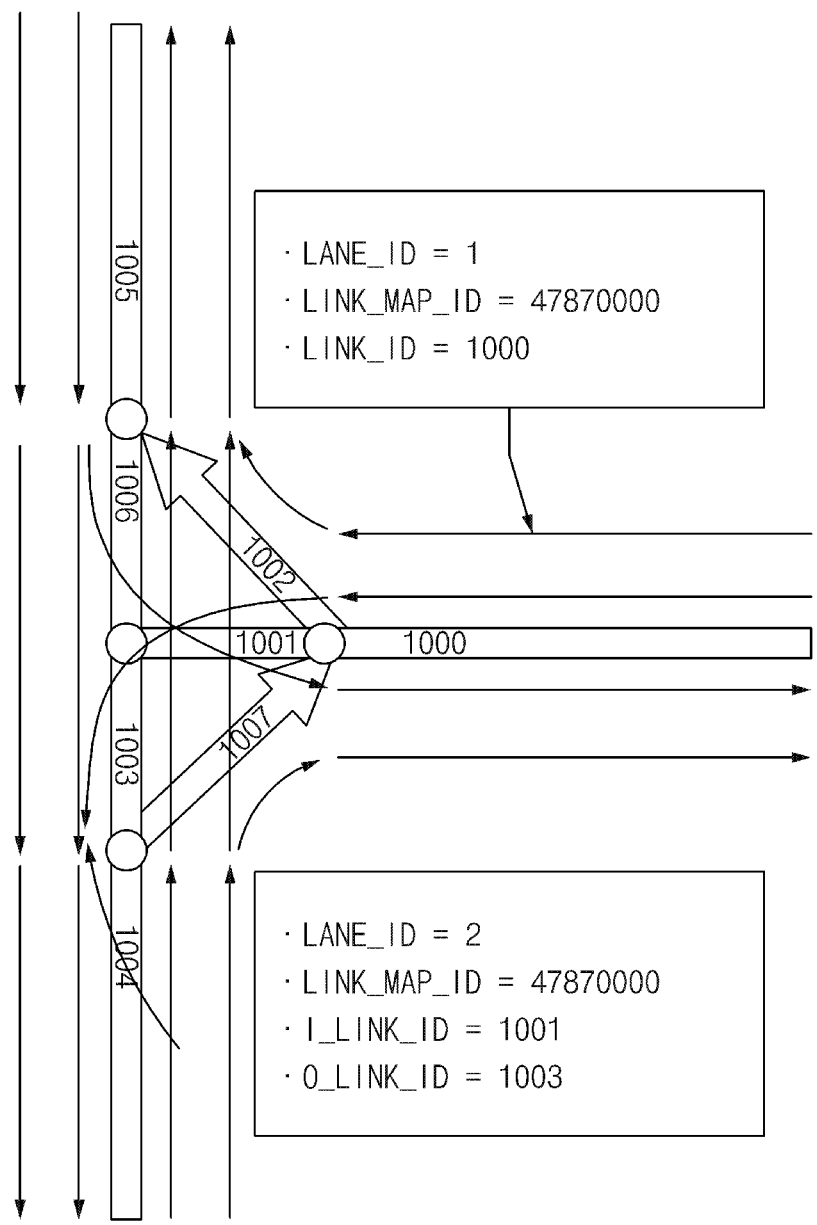
FIG. 3 illustrates an example of a high-precision lane-level road map.

FIG. 2 illustrates an example of a database schema of a high-precision lane-level road map in exemplary forms of the present disclosure, and FIG. 3 illustrates an example of a high-precision lane-level road map in exemplary forms of the present disclosure.

Referring to FIGS. 2 and 3, the high-precision lane-level road map refers to a map including all lane information more precisely than the navigation map including links and nodes. Here, a node refers to a point at which a new LINK ID or LANE ID is created by distinguishing LINK IDs or LANE IDs according to specific standards. For example, the node includes a point at which there is a new left-turn lane, an intersection, or the like.

In other words, the navigation map includes sketchy information about the total number of lanes on the road, the entire width of the road, and the like, but does not have precise data obtained by digitizing the properties/attributes (for example, lane width, curvature, and gradient) of individual lanes belonging to the road. On the other hand, the high-precision lane-level road map includes precise data obtained by previously measuring and digitizing physical properties of individual lanes through high-precision sensors, and information about unique connections of lane sections per lane (the connection of a lane section on which the vehicle is currently driving to another lane section ahead of or behind the vehicle), thereby representing a vehicle position or driving path more accurately.

With respect to database (DB) design as illustrated in FIG. 2, the high-precision lane-level road map may be associated with the navigation map through LINK ID. In other words, a connection between two map DBs may be established by adding a LINK ID column of a navigation map DB to a lane-level road map DB. Therefore, if MAP ID and LINK ID with respect to a location of a vehicle on a road are identified, information about individual lanes belonging to the corresponding road may be accessed.

The position recognition controller 320 may recognize the current position of the vehicle on the basis of the high-precision lane-level road map, the position recognition information, and the vehicle control information. To this end, the position recognition controller 320 includes an information fusion unit 321 and a position recognition message generation unit 322.

The information fusion unit 321 may fuse the position recognition information and the vehicle control information based on the high-precision lane-level road map. Here, information fusion may be made by considering all of the high-precision lane-level road map, the position recognition information, and the vehicle control information.

Figure 4:
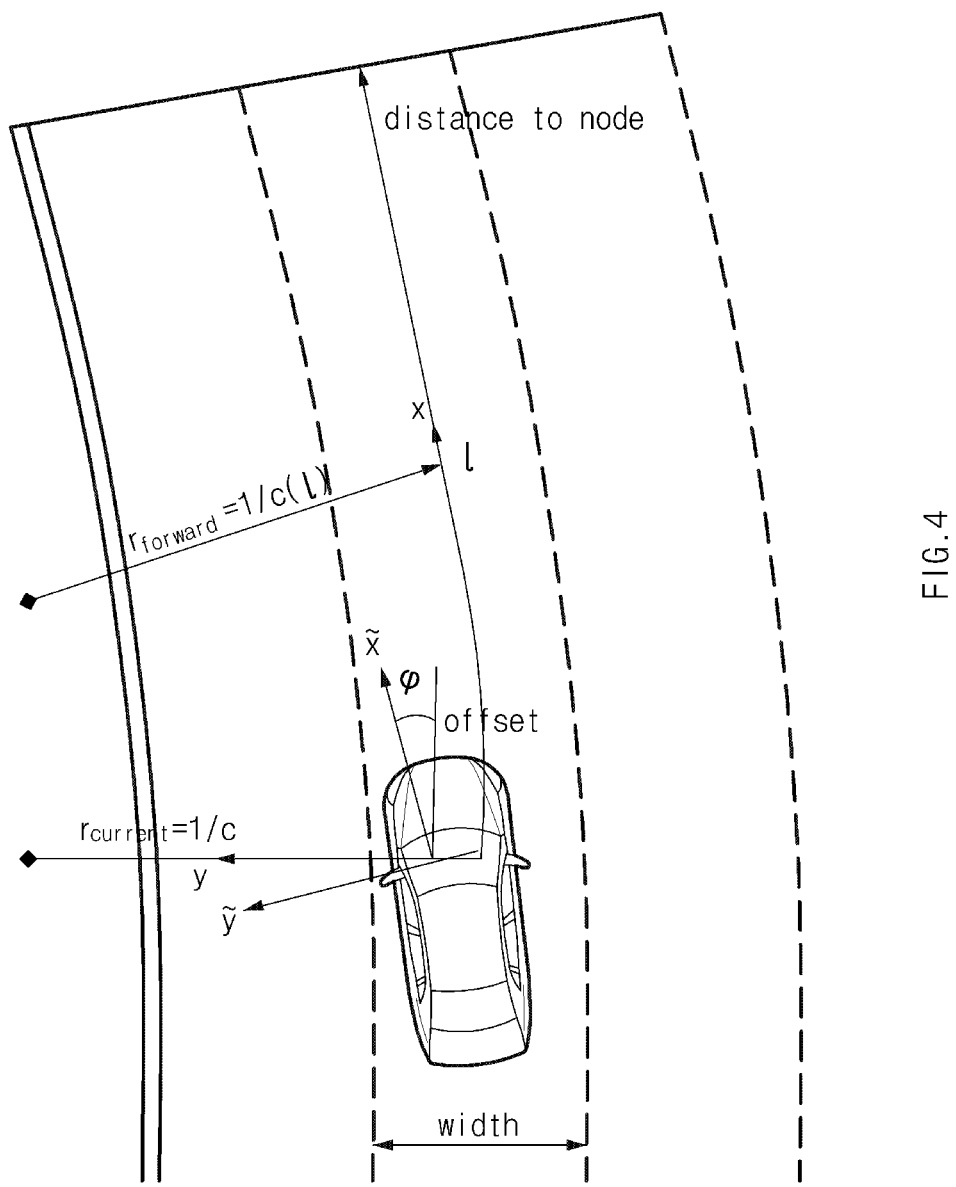
FIG. 4 illustrates an example of vehicle control information.

The position recognition message generation unit 322 may generate a position recognition message containing the fused position recognition information and vehicle control information. Here, as shown in table 1 below, the position recognition message contains the position recognition information and the vehicle control information. In particular, the position recognition information includes MAP ID, LINK ID, and LANE ID, and thus the position recognition message indicates which lane, which road, and which map the vehicle is currently driving. The vehicle control information includes lane width, offset, direction angle, distance left, and curvature, and indicates a relative position of the vehicle within a currently driving lane. FIG. 4 illustrates an example of vehicle control information in exemplary forms of the present disclosure. Referring to FIG. 4, a width of the currently driving lane, a lateral offset of the vehicle with respect to the centerline of the currently driving lane, a heading angle (j) of the vehicle with respect to the centerline of the currently driving lane, a distance left to a next node with respect to a current position, and a curvature (r) of the road with respect to the current position are illustrated.

TABLE 1

| Type | Column | Description |
|---|---|---|
| Position Recognition Information | MAP ID | MAP ID with respect to Current Position of Vehicle |
| | LINK ID | LINK ID with respect to Current Position of Vehicle |
| | LANE ID | LANE ID with respect to Current Position of Vehicle |
| Vehicle Control Information | Lane Width | Width of Currently Driving Lane |
| | Offset | Lateral Offset with respect to Centerline of Currently Driving Lane |
| | Direction Angle | Heading Angle with respect to Centerline of Currently Driving Lane |
| | Distance Left | Distance Left to Next Node with respect to Current Position of Vehicle |
| | Curvature | Curvature of Road with respect to Current Position of Vehicle |

The vehicle controller 330 may fuse the position recognition message with the obstacle detection information from the context-aware sensor system 200 to generate a path of the vehicle and determine an optimal controlled variable.

To this end, the vehicle controller 330 includes a path generation unit 331, a controlled variable calculation unit 332, and a current position calculation unit 333.

The path generation unit 331 may generate a global path when a desired destination is input, and generate a local path using the position recognition information, the vehicle control information, the high-precision lane-level road map, and the obstacle detection information while the vehicle is driving. Table 2 shows an exemplary configuration of a path generated from a current location to a destination.

TABLE 2

| MAP ID | LINK ID | LANE ID | Remarks |
|---|---|---|---|
| 4780050 | 8820 | 312 | Starting Point |
| 4780050 | 8820 | 311 | |
| 4780050 | 0 | 1278 | Right Turn |
| 4780050 | 11000 | 101 | |
| 4780050 | 11000 | 102 | |
| 4780050 | 11000 | 105 | |
| 4780050 | 0 | 1312 | Left Turn |
| 4780050 | 13010 | 221 | |
| 4780050 | 13010 | 220 | Destination |

The controlled variable calculation unit 332 may calculate a controlled variable for vehicle control according to the local path. Examples of calculating controlled variables will be described below.

Figure 5A:
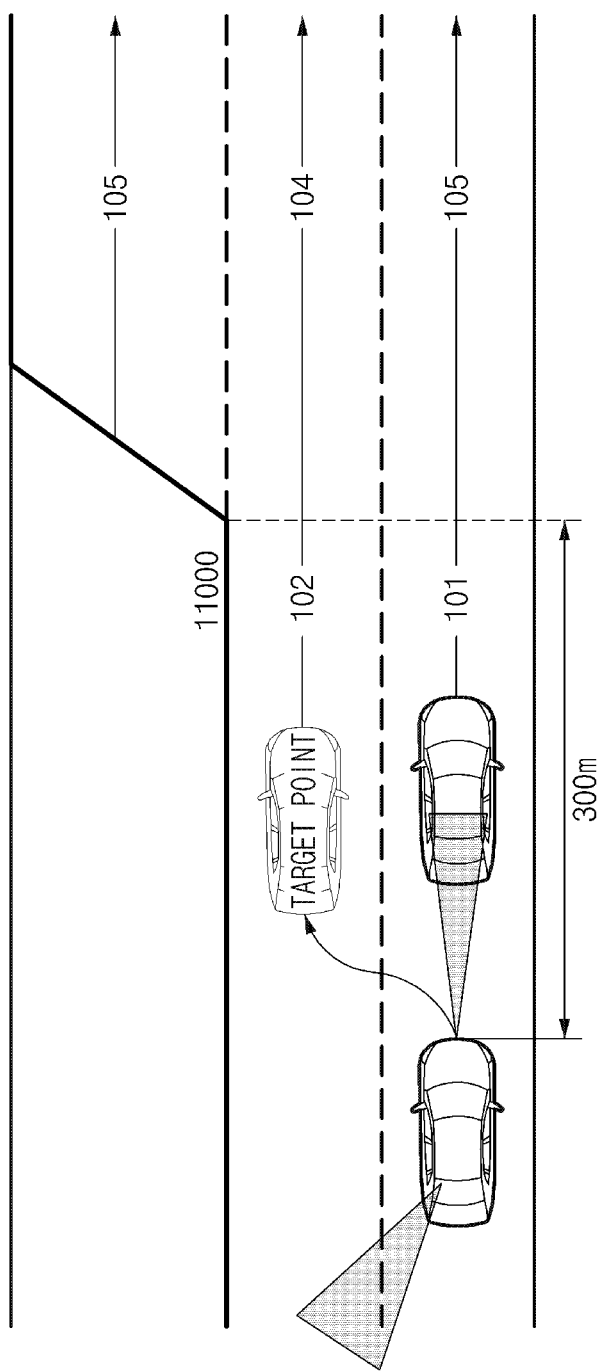
FIG. 5A illustrates vehicle control with respect to a path of overtaking a preceding vehicle.
Figure 5B:
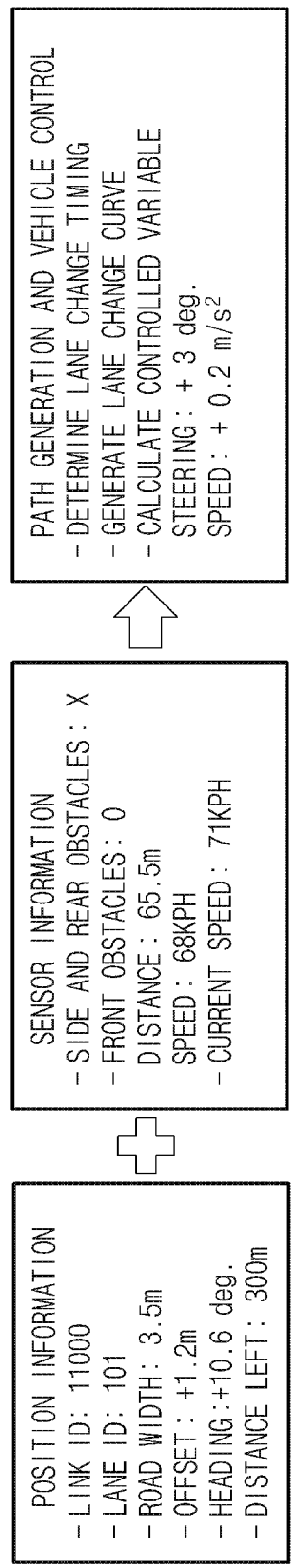
FIG. 5B illustrates examples of position recognition information and context-aware sensor information for vehicle control with respect to a path of overtaking a preceding vehicle.

FIG. 5A illustrates vehicle control with respect to a path of overtaking a preceding vehicle in exemplary forms of the present disclosure, and FIG. 5B illustrates examples of position recognition information and context-aware sensor information for vehicle control with respect to a path of overtaking a preceding vehicle in exemplary forms of the present disclosure. Referring to FIGS. 5A and 5B, based on the following information: LINK ID: 11000, LANE ID: 101, road width: 3.5 m, offset: +1.2 m, heading angle: +10.6 degree, distance to left: 300 m, side and rear obstacles: none (x), front obstacle: yes (O), distance to obstacle: 65.5 m, speed of moving obstacle: 68 KPH, and current speed of vehicle: 71 KPH, the controlled variable calculation unit 332 may determine a lane change timing, generate a lane change curve, and calculate controlled variables to increase a steering angle by +3 degree and a speed by +0.2 m/s².

Figure 6B:
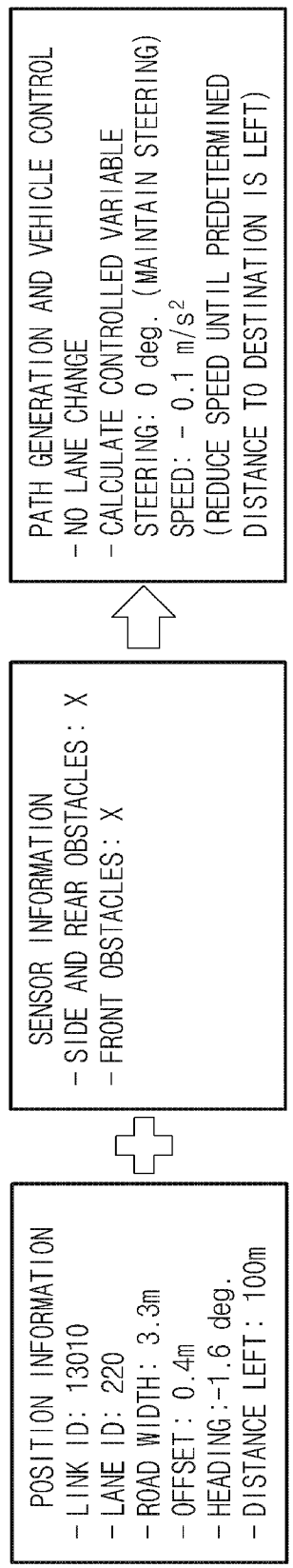
FIG. 6B illustrates examples of position recognition information and context-aware sensor information for vehicle control when the vehicle arrives at a destination.

FIG. 6A illustrates vehicle control when the vehicle arrives at a destination in exemplary forms of the present disclosure, and FIG. 6B illustrates examples of position recognition information and context-aware sensor information for vehicle control when the vehicle arrives at a destination in exemplary forms of the present disclosure. Referring to FIGS. 6A and 6B, based on the following information: LINK ID: 13010, LANE ID: 220, road width: 3.3 m, offset: −0.4 m, heading angle: −1.6 degree, distance left: 100 m, side and rear obstacles: none (x), and front obstacle: none (x), the controlled variable calculation unit 332 may determine that there is no need to change a lane, and calculate controlled variables to maintain a steering angle to be 0 degree and reduce a speed to −0.1 m/s².

The current position calculation unit 333 may calculate a current position of the vehicle and determine whether or not the vehicle has arrived at a destination.

The path storage 340 may store the global path and the local path from the current position of the vehicle to the destination generated by the path generation unit 331, the local path being generated by taking the obstacle detection information into consideration.

The steering system 400 may control the steering of the vehicle under the control of the automated driving control device 300.

The brake system 500 may perform decelerating and braking (stop) of the vehicle under the control of the automated driving control device 300.

As described above, the path of the vehicle may be generated by considering the fusion of all of the high-precision lane-level road map, the position recognition information, the vehicle control information, and the obstacle detection information, and thus automated driving reliability may be improved.

Figure 7:
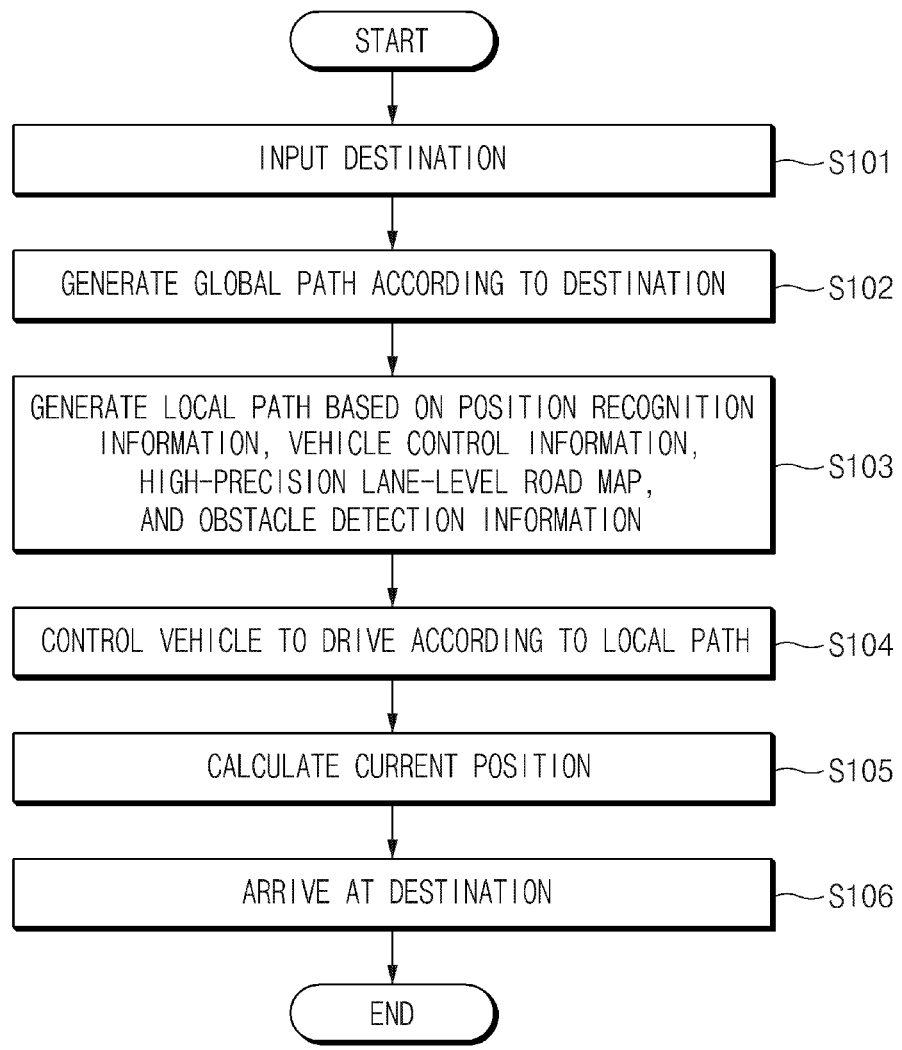
FIG. 7 illustrates a flowchart of an automated driving control method.

Hereinafter, an automated driving control method, in exemplary forms of the present disclosure, will be described in detail with reference to FIG. 7.

Figure 8:
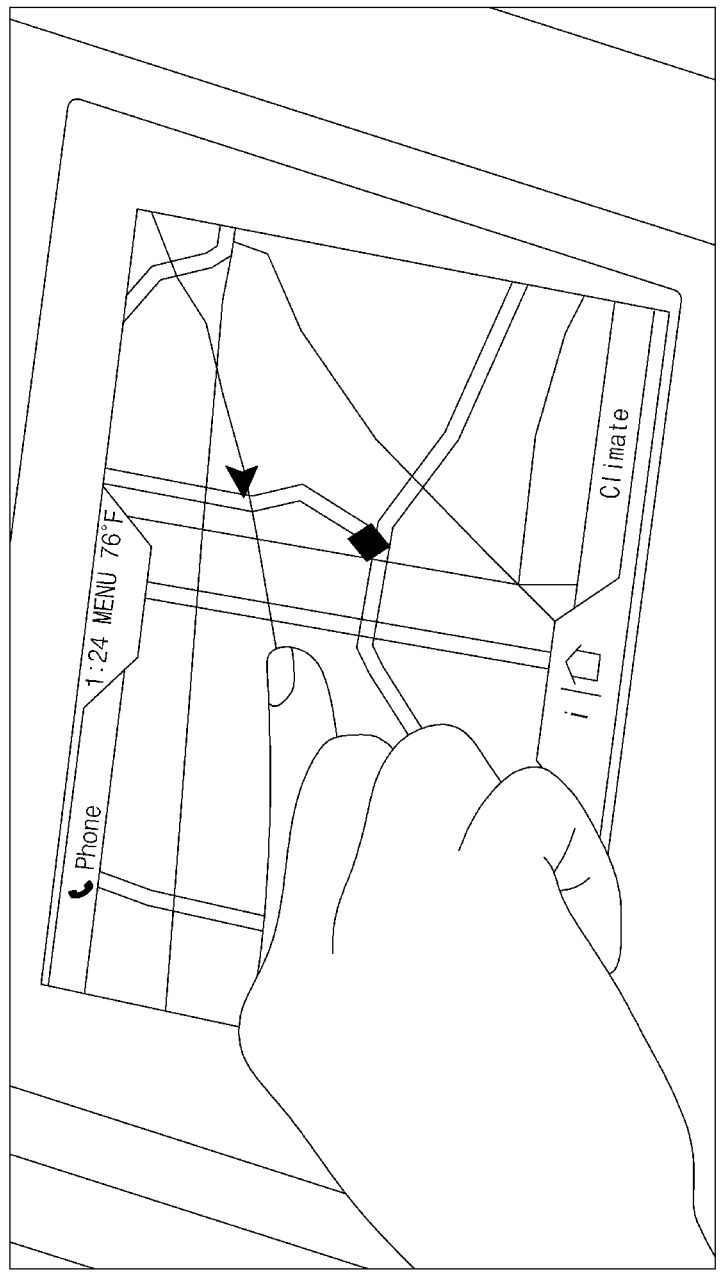
FIG. 8 illustrates an example of input of a destination, according to exemplary forms of the present disclosure.
Figure 9:
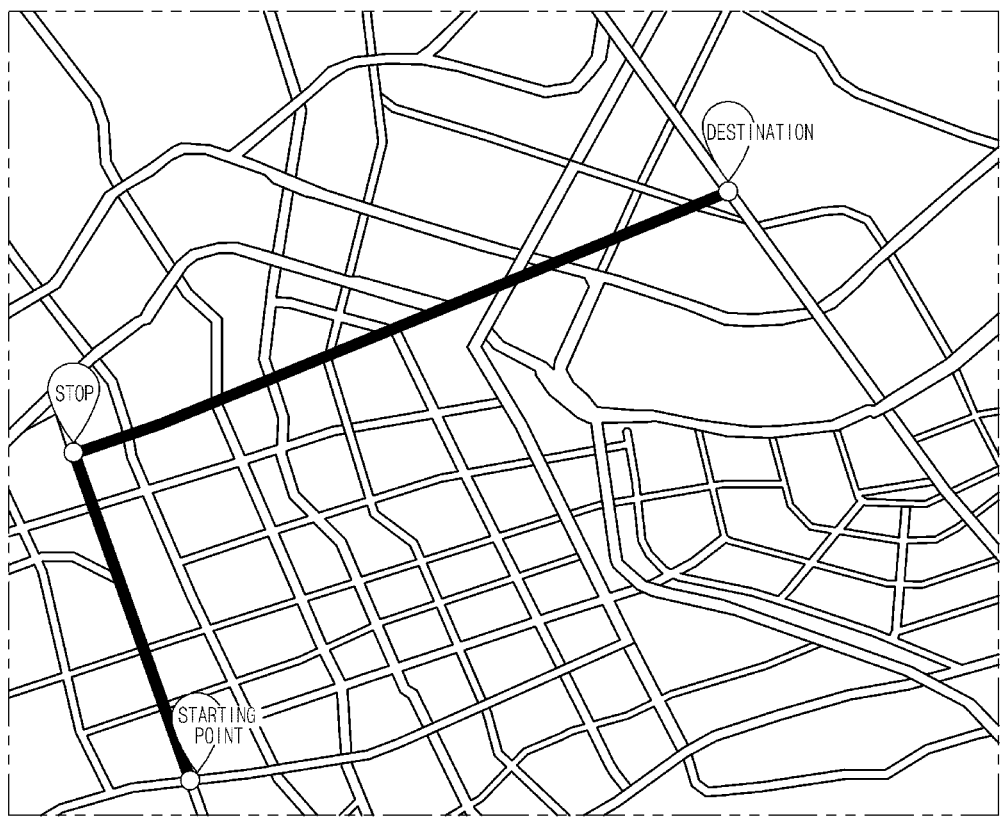
FIG. 9 illustrates an example of a global path, according to exemplary forms of the present disclosure.

First of all, when a destination is input in step S101, the automated driving control device 300 may generate a global path in step S102. FIG. 8 illustrates an example of input of a destination in exemplary forms of the present disclosure, and FIG. 9 illustrates an example of a global path in exemplary forms of the present disclosure.

When the vehicle starts to drive, the automated driving control device 300 may generate a local path on the basis of position recognition information, vehicle control information, a high-precision lane-level road map, and obstacle detection information in step S103.

Thereafter, the automated driving control device 300 may control the vehicle by calculating controlled variables in order to drive according to the local path in step S104, calculate a current position of the vehicle in step S105, and end the driving control when the vehicle has arrived at a destination in step S106.

Figure 10A:
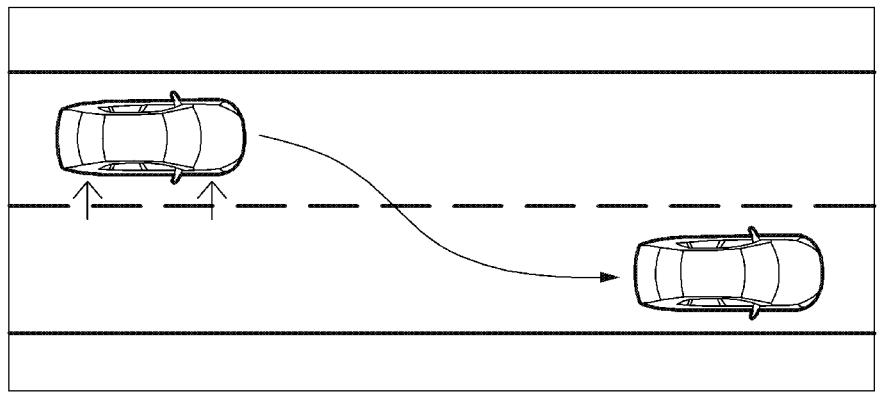
FIG. 10A illustrates an example of lane change.
Figure 10B:
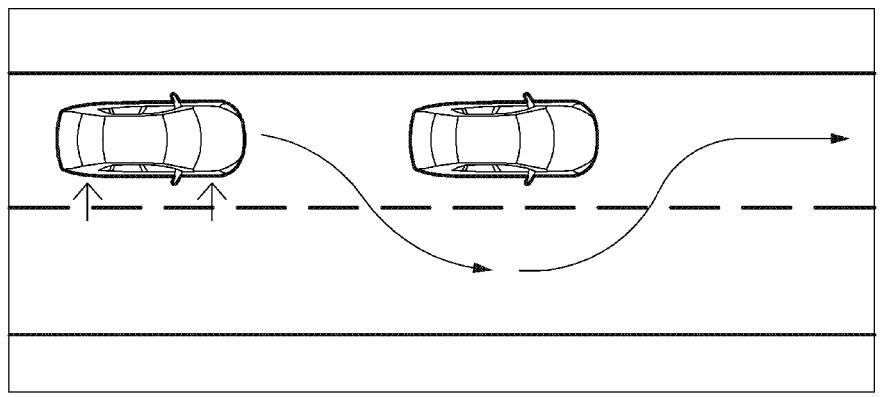
FIG. 10B illustrates an example of overtaking a preceding vehicle.
Figure 10C:
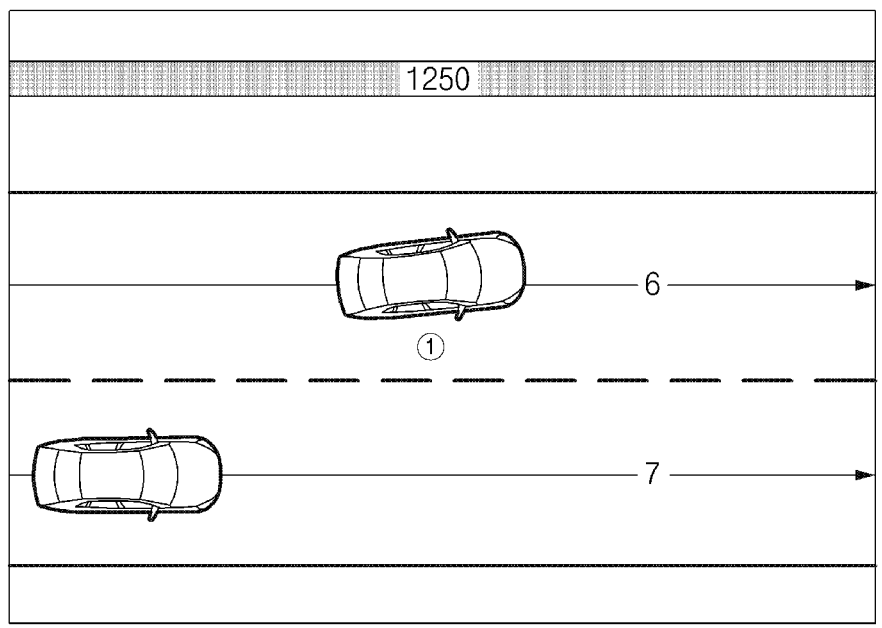
FIG. 10C illustrates an example of generating a message for vehicle control in lane change or overtaking.

FIG. 10A illustrates an example of lane change in exemplary forms of the present disclosure, FIG. 10B illustrates an example of overtaking a preceding vehicle in exemplary forms of the present disclosure, and FIG. 10C illustrates an example of generating a message for vehicle control in lane change or overtaking in exemplary forms of the present disclosure.

When the vehicle changes a lane or overtakes another vehicle as illustrated in FIGS. 10A and 10B, the automated driving control device 300 may control the vehicle by generating a position recognition message containing LINK ID, MAP ID, LANE ID, and driving lane information (vehicle control information), generating a local path for lane change or overtaking on the basis of the position recognition message and obstacle detection information, and calculating controlled variables allowing the vehicle to drive according to the local path as illustrated in FIG. 10C and Table 3 below.

TABLE 3

| | |
|---|---|
| LINK ID | 1250 |
| MAP ID | 478705 |
| LANE ID | 6 |
| Driving Lane Information | 103086292996250 (0x5DC1A5E0109A) (Road Width: 3.5 m/Offset: +0.9 m/Heading: +1.6 degree/ Distance Left to Next Node: 1,350 m/Road Curvature: 2,400 m) |

Figure 11A:
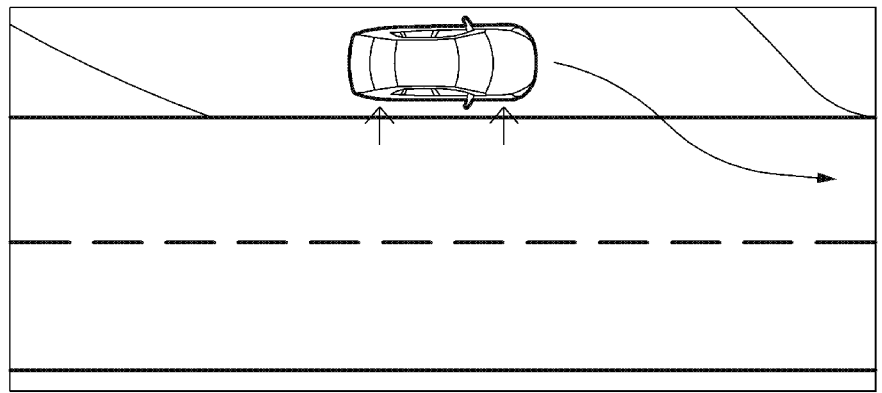
FIG. 11A illustrates an example of entry to a highway intersection.
Figure 11B:
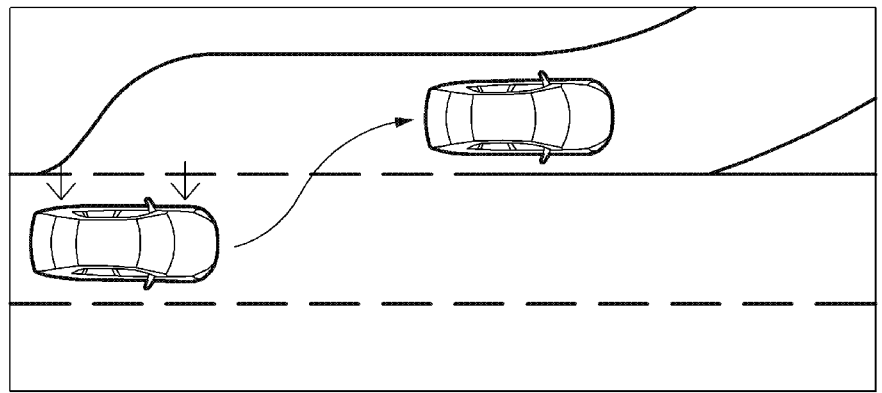
FIG. 11B illustrates an example of exit from a highway intersection.
Figure 11C:
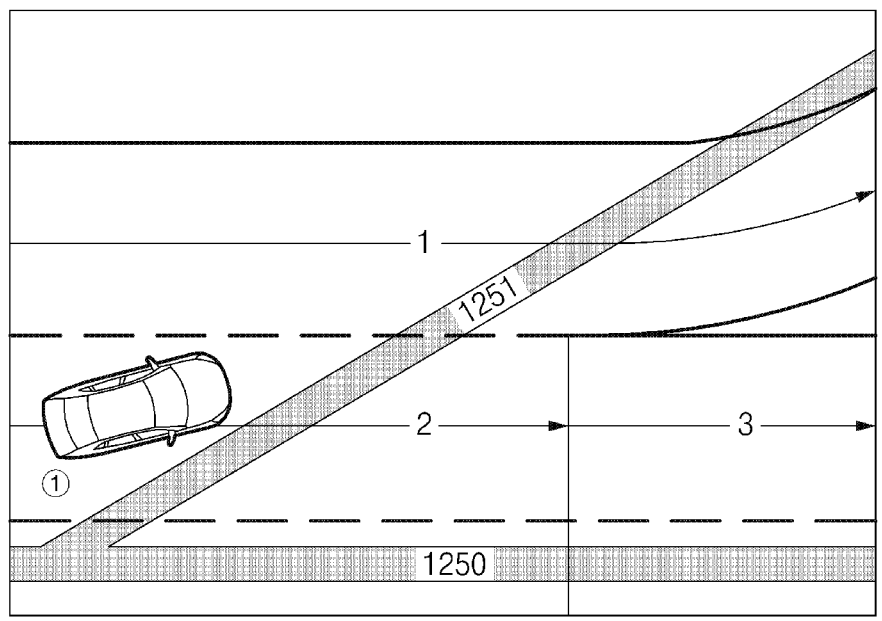
FIG. 11C illustrates an example of generating a message for vehicle control in entry to or exit from a highway intersection, according to exemplary forms of the present disclosure.

FIG. 11A illustrates an example of entry to a highway intersection in exemplary forms of the present disclosure, FIG. 11B illustrates an example of exit from a highway intersection in exemplary forms of the present disclosure, and FIG. 11C illustrates an example of generating a message for vehicle control in entry to or exit from a highway intersection in exemplary forms of the present disclosure.

When the vehicle enters or exits a highway intersection as illustrated in FIGS. 11A and 11B, the automated driving control device 300 may control the vehicle by generating a position recognition message containing LINK ID, MAP ID, LANE ID, and driving lane information (vehicle control information), generating a local path for entry to or exit from the highway intersection on the basis of the position recognition message and obstacle detection information, and calculating controlled variables allowing the vehicle to drive according to the local path as illustrated in FIG. 11C and Table 4 below.

TABLE 4

| | |
|---|---|
| LINK ID | 1250 |
| MAP ID | 478705 |
| LANE ID | 2 |
| Driving Lane Information | 27489101468874 (0x19004E20D4CA) (Road Width: 3.5 m/Offset: +1.2 m/Heading: +10.6 degree/Distance Left to Next Node: 250 m/Road Curvature: 3,200 m) |

By identifying the location of the vehicle using MAP ID, LINK ID, and LANE ID, and identifying the position of the vehicle using lane information, more accurate position recognition may be achieved.

In addition, by generating the position recognition message containing minimum information (road width, offset, direction angle, distance left, and curvature) desired for vehicle control in addition to the location of the vehicle, the present disclosure may provide the positional relationship of the vehicle and the information desired for vehicle control through the minimum message.

In addition, through the fusion of the position recognition information and the vehicle control information contained in the position recognition message with context-aware sensor information, the path of the autonomous vehicle may be generated in real time and the controlled variables may be determined.

Figure 12:
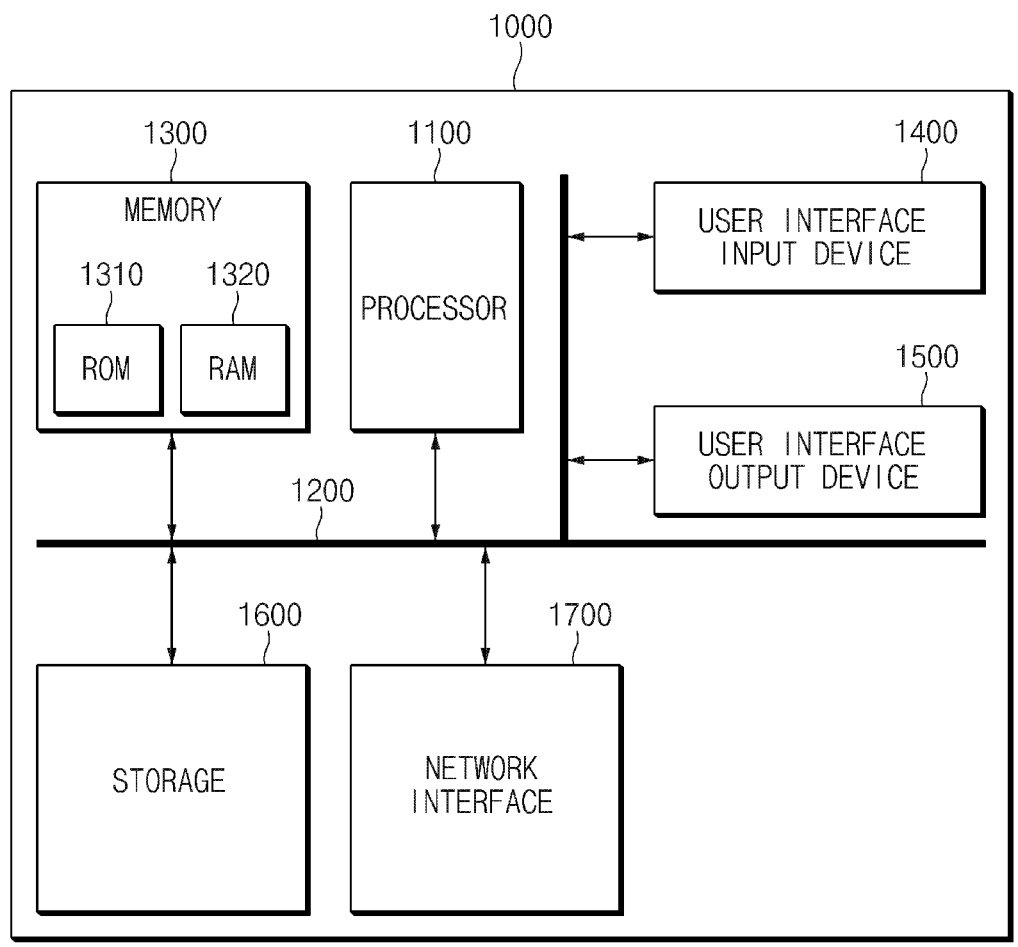
FIG. 12 illustrates the configuration of a computing system by which an automated driving control method in exemplary forms of the present disclosure is executed.

FIG. 12 illustrates the configuration of a computing system by which an automated driving control method in exemplary forms of the present disclosure is executed.

Referring to FIG. 12, a computing system 1000 includes: at least one processor 1100, a bus 1200, a memory 1300, a user interface input device 1400, a user interface output device 1500, a storage 1600, and a network interface 1700. These elements are connected through the bus 1200.

The processor 1100 may be a central processing unit (CPU) or a semiconductor device processing commands stored in the memory 1300 and/or the storage 1600. The memory 1300 and the storage 1600 include various types of volatile or non-volatile storage mediums. For example, the memory 1300 includes a read only memory (ROM) and a random access memory (RAM).

Therefore, the steps of the method or algorithm described in connection with the exemplary forms disclosed herein may be embodied directly in a hardware module or a software module that is executed by the processor 1100, or a combination of both. The software module may reside in storage mediums, i.e., the memory 1300 and/or the storage 1600, such as RAM, a flash memory, ROM, an erasable programmable read-only memory (EPROM), an electrically erasable programmable read-only memory (EEPROM), a register, a hard disk, a removable disk, and a CD-ROM.

The exemplary storage medium may be coupled to the processor 1100, such that the processor 1100 may read information from the storage medium and write information to the storage medium. Alternatively, the storage medium may be integrated with the processor 1100. The processor 1100 and the storage medium may reside in an application specific integrated circuit (ASIC). The ASIC may reside in a user terminal. In another form, the processor 1100 and the storage medium may reside as individual components in a user terminal.

The exemplary forms of the present disclosure may be designed to generate a path in light of fusion of position recognition information, vehicle control information and obstacle detection information, based on a high-precision lane-level road map including lane information, and control automated driving, thereby improving the reliability of automated driving.

In addition, the present disclosure may generate, by the position recognition controller, a simple message containing position recognition information and vehicle control information and transmit the message to the vehicle controller through controller area network (CAN) communications, thereby reducing communication load and enabling real-time information recognition and processing for automated driving.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An automated driving control device, comprising:
a memory configured to store a lane-level road map including map identifiers (MAP IDs) corresponding to respective positions of a vehicle, lane identifiers (LANE IDs) associated with lane information, and link identifiers (LINK IDs), and a navigation map including the MAP IDs and the LINK IDs; and
a processor configured to execute instructions stored in the memory and configured to:
recognize a current position of the vehicle based on the lane-level road map, position recognition information, and vehicle control information including the lane information associated with respective LANE IDs;

generate a global path on the navigation map and a local path on the lane-level road map for driving to a destination using the current position of the vehicle based on the lane-level road map and obstacle recognition information; and control driving of the vehicle, wherein the LINK IDs in the lane-level road map correspond to the LINK IDs in the navigation map, and the LINK IDs associate the lane information of the lane-level road map with navigation map data of the navigation map, and wherein the processor is further configured to:

use the LINK IDs to identify the current position of the vehicle on a current lane in which the vehicle is traveling on the lane-level road map, access to lane information of the current lane stored in the lane-level road map, and generate the vehicle control information including a lateral offset of the vehicle with respect to a centerline of the current lane and a heading angle of the vehicle with respect to the centerline so as to determine a lane change timing and a change to a steering angle of the vehicle to follow the local path.

2. The automated driving control device according to claim 1, wherein the lane information includes information about a connection of a lane section on which the vehicle is currently driving to another lane section ahead of or behind the vehicle.

3. The automated driving control device according to claim 1, wherein the processor is configured to:

fuse the position recognition information and the vehicle control information based on the lane-level road map; and generate a position recognition message containing the fused position recognition information and vehicle control information.

4. The automated driving control device according to claim 1, wherein the processor is configured to:

generate the global path when the destination is input; and generate the local path using the position recognition information, the vehicle control information, the lane-level road map, and the obstacle detection information while the vehicle is driving.

5. The automated driving control device according to claim 4, wherein the processor is configured to calculate the current position of the vehicle to determine whether or not the vehicle has arrived at the destination.

6. The automated driving control device according to claim 1, wherein the position recognition information includes at least one of a MAP ID corresponding to the current position of the vehicle, the LINK IDs, or a LANE ID corresponding to the current lane in which the vehicle is traveling, with respect to the current position of the vehicle.

7. The automated driving control device according to claim 1, wherein the vehicle control information includes at least one of a width of a currently driving lane, a distance left to a next node with respect to the current position of the vehicle, or a curvature of a road with respect to the current position of the vehicle.

8. An automated driving control system, comprising:

a context-aware sensor system configured to detect an obstacle around a vehicle; and an automated driving control device comprising:

a memory configured to store position recognition information received from the vehicle from global navigation satellite system (GNSS) information, obstacle detection information received from the context-aware sensor system, and a lane-level road map; and a processor configured to execute instructions stored in the memory and configured to:

generate a path on a navigation map of the vehicle based on the position recognition information, vehicle control information, the lane-level road map, and the obstacle detection information; and control automated driving of the vehicle, wherein the lane-level road map includes map identifiers (MAP IDs) corresponding to respective positions of the vehicle, lane identifiers (LANE IDs) associated with lane information, and link identifiers (LINK IDs), and the navigation map includes MAP IDs and the LINK IDs, wherein the LINK IDs in the lane-level road map correspond to the LINK IDs in the navigation map, and the LINK IDs associate the lane information of the lane-level road map with navigation map data of the navigation map, and wherein the processor is further configured to:

use the LINK IDs to identify a current position of the vehicle on a current lane in which the vehicle is traveling on the lane-level road map, access to the lane information of the current lane stored in the lane-level road map, and generate the vehicle control information including a lateral offset of the vehicle with respect to a centerline of the current lane and a heading angle of the vehicle with respect to the centerline so as to determine a lane change timing and a change to a steering angle of the vehicle to follow the path.

9. The automated driving control system according to claim 8, wherein the processor is configured to:

recognize the current position of the vehicle based on the lane-level road map, the position recognition information, and the vehicle control information;

generate a path for driving to a destination based on the current position of the vehicle; and control the driving of the vehicle.

10. The automated driving control system according to claim 8, wherein the context-aware sensor system comprises at least one of a camera, a radio detection and ranging (RADAR) sensor, a light detection and ranging (LiDAR) sensor, or an ultrasonic sensor.

11. An automated driving control method, comprising:

generating, by a path generation unit, a global path on a navigation map when a destination is input;

starting, by an automated driving control device, a vehicle to drive according to the global path;

generating, by the path generation unit, a local path on the navigation map using at least one of position recognition information based on a lane-level road map, vehicle control information, or obstacle detection information while the vehicle is driving; and controlling, by the automated driving control device, the vehicle to drive according to the local path, wherein the lane-level road map includes map identifiers (MAP IDs) corresponding to respective positions of the vehicle, lane identifiers (LANE IDs) associated with lane information, and link identifiers (LINK IDs), and the navigation map includes MAP IDs and the LINK IDs, wherein the LINK IDs in the lane-level road map correspond to the LINK IDs in the navigation map, and the LINK IDs associate the lane information of the lane-level road map with navigation map data of the navigation map, wherein the LINK IDs are used to identify a current position of the vehicle on a current lane in which the vehicle is traveling on the lane-level road map, and wherein generating the local path comprises:

accessing to the lane information of the current lane stored in the lane-level road map, generating the vehicle control information including a lateral offset of the vehicle with respect to a centerline of the current lane and a heading angle of the vehicle with respect to the centerline, determining a lane change timing and a change to a steering angle of the vehicle to follow the local path.

12. The automated driving control method according to claim 11, further comprising:

calculating, by the automated driving control device, the current position of the vehicle to determine whether or not the vehicle has arrived at the destination, and ceasing to control the vehicle when the vehicle has arrived at the destination.

13. The automated driving control method according to claim 11, wherein the lane information includes information about a connection of a lane section on which the vehicle is currently driving to another lane section ahead of or behind the vehicle.

14. The automated driving control method according to claim 11, wherein the position recognition information includes at least one of a MAP ID corresponding to the current position of the vehicle, the LINK IDs, or a LANE ID corresponding to the current lane in which the vehicle is traveling, with respect to the current position of the vehicle.

15. The automated driving control method according to claim 11, wherein the vehicle control information includes at least one of a width of a currently driving lane, a distance left to a next node with respect to the current position of the vehicle, or a curvature of a road with respect to the current position of the vehicle.

16. The automated driving control method according to claim 11, wherein the generating of the local path comprises determining the lane change timing when there is an obstacle around the vehicle from the obstacle detection information, generating a lane change curve, and calculating a controlled variable of the vehicle.

17. The automated driving control method according to claim 16, wherein the controlled variable of the vehicle comprises variables associated with steering the vehicle and a speed of the vehicle.

* * * * *